(12) United States Patent
Fricker et al.

(10) Patent No.: US 7,409,359 B2
(45) Date of Patent: Aug. 5, 2008

(54) CONFIGURATOR FOR CONFIGURING AND DISPLAYING THE APPEARANCE OF AN ARTICLE TO BE CONFIGURED

(75) Inventors: Achim Fricker, Brusseler Strasse 85, 50672 Koln (DE); Gerd Stoll, Braunschweig (DE); Ulrich Heiny, Wolfsburg (DE)

(73) Assignees: Volkswagen Aktiengesellschaft, Wolfsburg (DE); Achim Fricker, Cologne (DE); Ercin Filizli, Cologne (DE)

( * ) Notice: Subject to any disclaimer, the term of this patent is extended or adjusted under 35 U.S.C. 154(b) by 369 days.

(21) Appl. No.: 10/482,751

(22) PCT Filed: Jun. 28, 2002

(86) PCT No.: PCT/EP02/07168

§ 371 (c)(1), (2), (4) Date: May 7, 2004

(87) PCT Pub. No.: WO03/005253

PCT Pub. Date: Jan. 16, 2003

(65) Prior Publication Data

US 2005/0108099 A1   May 19, 2005

(30) Foreign Application Priority Data

Jun. 29, 2001   (DE) .............................. 101 31 045

(51) Int. Cl.
*G06Q 30/00*   (2006.01)
*G06F 17/30*   (2006.01)

(52) U.S. Cl. .......................................... 705/26; 705/27

(58) Field of Classification Search ..................... 705/1, 705/26–27

See application file for complete search history.

(56) References Cited

U.S. PATENT DOCUMENTS

| 4,359,631 | A | * | 11/1982 | Lockwood et al. | .......... 235/381 |
| 4,510,495 | A |   | 4/1985  | Sigrimis et al. |                   |
| 4,931,929 | A | * | 6/1990  | Sherman         | ..................... 705/500 |
| 5,586,197 | A | * | 12/1996 | Tsujimura et al.| ........... 382/162 |

OTHER PUBLICATIONS

"Microchip's RF chips seen as alternative to bar codes in identification applications". Dunn, Darrell. Electronic Buyer's News. Dec. 8, 1997, Iss. 1087, p. 20. [recovered from progquest database Sep. 18, 2006].*

* cited by examiner

*Primary Examiner*—Naeem Haq
*Assistant Examiner*—William J. Allen
(74) *Attorney, Agent, or Firm*—Darby & Darby

(57) ABSTRACT

A configurator and a method of configuring articles has a processor with a memory for storing at least one data record representative of the outward appearance of a type of article and data representative of a plurality of different element designs related with one type of article. A user selects an article and an element design of the article to be configured. There are a plurality of samples, each having a property related to an element design and each sample contains data of the element design and its related property. The data of one or more samples is recognized and associated with the stored element design of the element of the article and the property of the element design is displayed.

7 Claims, No Drawings

CONFIGURATOR FOR CONFIGURING AND DISPLAYING THE APPEARANCE OF AN ARTICLE TO BE CONFIGURED

FIELD OF THE INVENTION

The invention relates to a configurator for configuring articles.

BACKGROUND OF THE INVENTION

Certain articles, such as kitchen furniture or appointments, articles of clothing or automobiles, can be configured as desired by the individual customer. It is, for example, common practice that a buyer of a new motor vehicle determines first the type of article, i.e. he selects the type and the model at the respective car dealer. The thus determined article is then configured by the customer. The customer has the possibility of freely selecting various article designs. The term article design can stand for technical features, such as the type of engine provided and technical options. Article design in the sense of the present invention is, however, especially the design of the article appealing to the aesthetic sense, i.e. the colour of the outer paint finish, the colour of the upholstery, the type of upholstery, the colour of trim strips, the colour of keters, the type of wood or the grain of wood inlays, etc.

Renowned car manufacturers offer nowadays the possibility of configuring a vehicle over the Internet, via terminals or via CD-Roms made available to the customer. On the respective page of the enterprise, the potential buyer is first requested to select a type of article, i.e. a specific model of the car manufacturer. Subsequently, the article is designed as desired by the individual customer, guided by a menu. The customer is conducted through various selection areas in which he has to select first e.g. the desired engine, a design package, then the colour of the vehicle, the type of upholstery, etc. In the case of this menu guidance, all the fields must be worked through in the predetermined sequence. The selection of a specific article design has the effect that the initially selected type of article displayed in the form in question on the screen will be represented in accordance with the selected article design. For example, the article design selection "colour of the outer paint finish" will, after selection of a desired colour by the customer, be realized by a processor, which is associated with the screen, and the type of article displayed on the screen will be shown with the desired colour. A corresponding to realization is imaginable for the selection of the wheel rims, the selection of the colour of the upholstery, perhaps the selection of the type of upholstery, etc.

When vehicles are being configured, data originating from the engineering departments of the respective car manufacturers are often used for graphically representing the type of article. These data allow arbitrary three-dimensional views of the type of article selected. When a motor vehicle is being configured, it is therefore known to show to the user the motor vehicle that it just being configured in any three-dimensional representation desired. For example, enlarged details can be zoomed in; the vehicle to be configured can be rotated. A view into the passenger compartment of the vehicle can be shown as well. The representation of these various, preferably three-dimensionally represented views normally takes place on a stationary screen.

In the prior art, the selection of a type of article, and especially of the respective article designs, is carried out via an input unit. This input unit can be defined by a keyboard or a mouse operating device. Frequently, so-called touch screens are used for inputting data, since a touch screen can be handled easier and more playfully by the user. Nevertheless, also the user using a touch screen has to work through the predetermined areas in the given sequence so as to take all the decisions for configuring his vehicle.

The known systems are therefore inflexible. In addition, they require a certain amount of practice in handling a computer, at least via the touch screen. The handling of the programs for carrying out the configuring necessitates familiarization at least to a certain degree. In addition, it should be taken into consideration that the age of persons who buy most frequently a new car is approx. 46. Such persons cannot be expected to deal with a computer quite naturally. Irrespectively of his age, the user of a configurator will feel himself restricted with regard to his freedom of design by the given menu, and this will definitely have a negative effect on the fun of configuring an article to be ordered. Finally, mere representations on a screen do not provide the possibility of sufficiently experiencing the effect of the selected designs and of their interplay when the configuring process has been finished. This applies in particular to cases where design elements having a texture and specific haptic properties are to be selected and combined with one another.

BRIEF SUMMARY OF THE INVENTION

Taking this as a basis, the technical problem underlying the present invention is to provide a configurator of the type referred at the beginning, which can be handled more easily and which provides the possibility of experiencing the effect of the individual article design selected and, in particular, the combinatorial effect of various article designs selected. In addition, it is the object of the present invention to provide a method for configuring articles, which can be handled more easily and which provides the possibility of experiencing the effect of the article designs selected.

DETAILED DESCRIPTION OF THE INVENTION

As far as the device is concerned, the present invention discloses a configurator for solving the above problem. The configurator differs from the prior art insofar as a recognition means is provided with the aid of which a sample of the selectable article design can be recognized. This recognition means is implemented such that it detects an article design signal which is representative of the article design. The article design signal is associated with the sample. When the sample is being selected, the article design signal is determined simultaneously. Via the recognition means, this article design signal is advanced to the processor, which will select a specific article design from the article design memory and display said article design on the screen.

It follows that, in contrast to the prior art, the configurator according to the present invention offers the advantage that individual article designs exist in the form of real samples, which are combined when the article is being configured. Each individual sample allows the effect of the respective selected article design to be experienced. Taking still a motor vehicle as an example, the paint finish, e.g. a metallic finish with its light reflections and its metallic gleam, appears as a real image much more attractive than in the case of a mere representation on a screen. The screen takes over the article design signal representative of the paint finish selected and displays the type of article on the screen in a three-dimensional configuration with the paint finish selected. The paint finish detail can, however, be experienced on the basis of the sample.

In addition, the present invention offers the possibility of genuinely experiencing the inter-play of the individual article designs selected. For example, a respective sample can be selected for various article designs and the samples in question can be arranged side by side or on top of one another. The article design signals taken from the individual samples are detected by the recognition means for producing an overall image, and advanced to the processor for the purpose of representation. On the basis of the representation on the screen, the interplay of the colours and the total three-dimensional effect produced can be conveyed. A genuine experience of the interplay of the individual article designs is, however, realized via the interplay of the really existing samples.

On the basis of the recognition means for recognizing a sample, the configurator according to the present invention allows the effect of the genuine article design to be experienced directly. This direct experience is much more intensive than any representation on a screen. This is even more relevant in cases where various article designs, e.g. for the passenger compartment of a motor vehicle, are combined with one another (colour of the upholstery, type of upholstery, colour of keters, perhaps the type of wood and the grain of wood inlays). In contrast to the prior art, the configurator according to the present invention also offers a haptic impression of the respective article designs to be selected since the samples exist in reality. It follows that the configurator according to the present invention provides an almost real image of the article which will be produced later on according to the customer's wishes. The configurator according to the present invention emotionalizes, on the basis of the actually existing samples and their noble effect, the selection decision that has to be taken for each article design. This selection decision can be taken without the necessity of interacting directly with the processor via the screen, but for representing the article in the selected article design. It will suffice to select the sample in question, to take hold of it and to transfer it to the recognition means. Handling the configurator according to the present invention is therefore very easy.

Any imaginable means which has been prepared such that it is able to recognize, on the basis of specific information carriers, an unequivocally defined article design can be used as a recognition means. It is, for example, imaginable to provide a barcode recognition means and to provide corresponding and individual barcodes on the respective samples. From the viewpoint of sales psychology, it should, however, be preferred to use recognition means which do not necessitate special handling for reading in the article design signal. The recognition means is therefore preferably provided with a receiver unit which is adapted to receive the article design signal of a transmitting unit associated with the sample. In a sales talk, a large number of samples for an article design will be offered for selection. By coordinating the transmitting units and the receiver units in a suitable manner, it should be guaranteed that the article design signal associated with the sample will be ascertained by the receiver unit only after the selection of a specific sample and the transfer of said sample to a predetermined local area.

A preferred embodiment of the device offers the advantage that the transmitting unit provided on the sample is capable of functioning without having a power source of its own. The transmitting unit can thus preferably be incorporated into the sample, a solution which should be preferred because the aesthetic impression will thus be impaired as little as possible. In another embodiment the receiver unit includes a receiver plate and the transmitting unit of the sample is defined by a transponder which transmits the article design signal through energy supplied by the receiver plate. When the transmitting unit is defined by a transponder in accordance with a further development according to the present invention, maintenance and repair work will not be necessary for the transponder.

According to a further preferred development of the present invention, the transmitting unit is programmable. This offers the advantage that the transmitting unit can first be connected to the respective sample, preferably incorporated in the sample, without the necessity of taking into consideration what kind of information the transmitting unit carries. Furthermore, it is possible to program the transmitting unit with additional information which turns out to be necessary only when the configurator is in use.

Another preferred embodiment of the configurator according to the present invention is provided with a design element memory, which is known per se and which is associated with the processor; in said design element memory, various selectable design elements are stored. Each of these various design elements is associated with different designs in the article design memory. For a motor vehicle, which is the example referred in the present connection, the design element is e.g. the outer paint finish. This design element has associated therewith various colours as variable article design. The design element memory has stored therein a plurality of different design elements, which are, taking still an automobile as an example: colour of the vehicle, upholstery, existence of trim strips, steering wheel design and the like.

In the case of the configurator according to the present invention, also this design element memory is addressed by the sample selected. For this purpose, the sample selected has associated therewith an element signal through which a specific design element is selected from the design element memory. In other words, the element signal indicates the "function" and the "location" of a sample, whereas the article design signal indicates the "outward appearance" of a sample. Due to the combinatorial form of the article design memory and of the design element memory, which are each addressed by the sample selected, it is possible to select several samples simultaneously and to read them in via the recognition means.

On the basis of each individual sample, the function of the respective sample (element signal) and the outward appearance of said sample (article design signal) will then be detected. Taking still a motor vehicle as an example, an almost complete image of the interior trim of the vehicle will be obtained when the following is selected: a sample for the upholstery (texture and colour); a sample for a trim strip; a sample for a keter as well as a sample for an inlay. Within the framework of a sales talk, it will not be necessary to assign the function to the respective samples. The sample carries both the information "outward appearance" as well as the information "function".

From the above, it can be seen that the present invention provides a configurator which, making use of configurator elements that are known per se, establishes a direct relationship with the article designs to be selected. The quality of the material, the precise effect and especially the texture and the haptic properties of the article design can be experienced genuinely. The overall optical impression is—just as in the prior art—created via one or a plurality of screens when the selected article designs are being realized. The customer and orderer of an article who makes use of the configurator is not compelled to communicate with the processor via a screen and/or a keyboard. This communication can take place exclusively through the sample selected. The configurator according to the present invention allows the configuring of an article, e.g. of a motor vehicle, to be experienced in an hitherto unknown manner. The customer only concerns himself with the selection of the materials and experiences an interplay of the materials in the real world. The customer has a complete freedom of design, and he is not restricted with respect to the input of his selection and the temporal sequence of his selection steps. The customer experiences the configuring of the article as an event free from any direct interaction with the processor. Also a salesman assisting the customer can fully concentrate his attention on the customer and the sales talk and does not have to concentrate on the input of data into the processor.

In addition, the configurator is completely intuitive. The customer only has to take hold of the sample and arrange the sample in a predetermined area. He can combine an arbitrary number of different article designs, each in the form of a sample, and obtain any article design in this way. Especially when a design element memory is realized, the customer is absolutely free in sequentially selecting each individual article design.

The configurator according to the present invention may, of course, also comprise a type-of-article memory which is addressed by a sample which is representative of the type of article and which is recognized by the recognition means. It is easily imaginable to control the configurator through samples alone, to such an extent that e.g. even a very complex article, such as an automobile, will be configured up to an including the last freely selectable equipment feature.

For solving the method aspect of the above-mentioned problem, the present invention suggests, accordingly, a configuring method for configuring articles, comprising the steps of representing, in a manner known per se, a known type of article on a screen, and selecting at least one article design, as well as displaying on the screen the represented type of article with the selected article design. The method according to the present invention differs, however, from the prior art insofar as the article design is determined via a signal processed in a processor, said signal being associated with a selected real sample of the article design in question.

The invention claimed is:

1. A configurator for configuring and displaying the appearance of an article to be configured with different design elements that are selectable corresponding to the article comprising:
    a processor having associated therewith a type-of article memory, which has stored therein at least one data record representative of the outward appearance of a type of an article to be configured and a design element memory having stored therein data representative of a plurality of different design elements and associated outer appearance thereof related to one type of article;
    an input unit for selecting an article to be configured;
    a plurality of samples each representing the outer appearance of a different design element of the article to be configured and to be selected by a user of the configurator;
    a transmitting unit associated with each sample for transmitting signals indicative of a specific design element and of the outer appearance of the design element and
    a recognition means including a receiver unit for receiving the signals from the transmitting unit associated with a selected sample and for recognizing a sample selected from the plurality of samples, said recognition means detecting from the received signals the design element and by means of which the specific design element corresponding to the sample is selected from the processor design element memory;
    wherein the transmitting unit associated with a selected sample and the receiver unit of the recognition means are adapted to one another in such a way that the signals of the sample selected from the plurality of samples presented to the user of the configurator will not be detected by the receiver unit until the selected sample has been transferred to a predetermined local area that is within reach of the user; and
    a display screen operated by said processor in response to the article to be configured selected by said input unit for displaying the outer appearance of the article to display the outer appearance of a design element of the article to be configured in accordance with the signals received by said recognition means receiver unit from said transmitting unit based on a selected sample.

2. A configurator according to claim 1, wherein the receiver unit comprises a receiver plate, and wherein the transmitting unit is defined by a transponder which transmits the article design signal through energy supplied by said receiver plate.

3. A configurator according to claim 1, wherein the transmitting unit is adapted to be programmed.

4. A configurator according to claim 1, further comprising a design element memory, associated with the processor and which has stored therein various selectable design elements, each of said design elements having associated therewith various designs in the article design memory, and wherein a sample has associated therewith an element signal which is representative of the design element and by means of which a specific design element is selected from the design element memory.

5. A configurator according to claim 1 wherein said samples are physical samples.

6. A configurator as claimed in claim 1 wherein said recognition means comprises a transmitter for transmitting data from a sample and a receiver for receiving the transmitted data.

7. A configurator as claimed in claim 5 further comprising a receiver plate on which one or more of said samples are placed.

* * * * *